No. 867,968. PATENTED OCT. 15, 1907.
J. M. GILBERT.
DISH WASHER.
APPLICATION FILED OCT. 9, 1906.
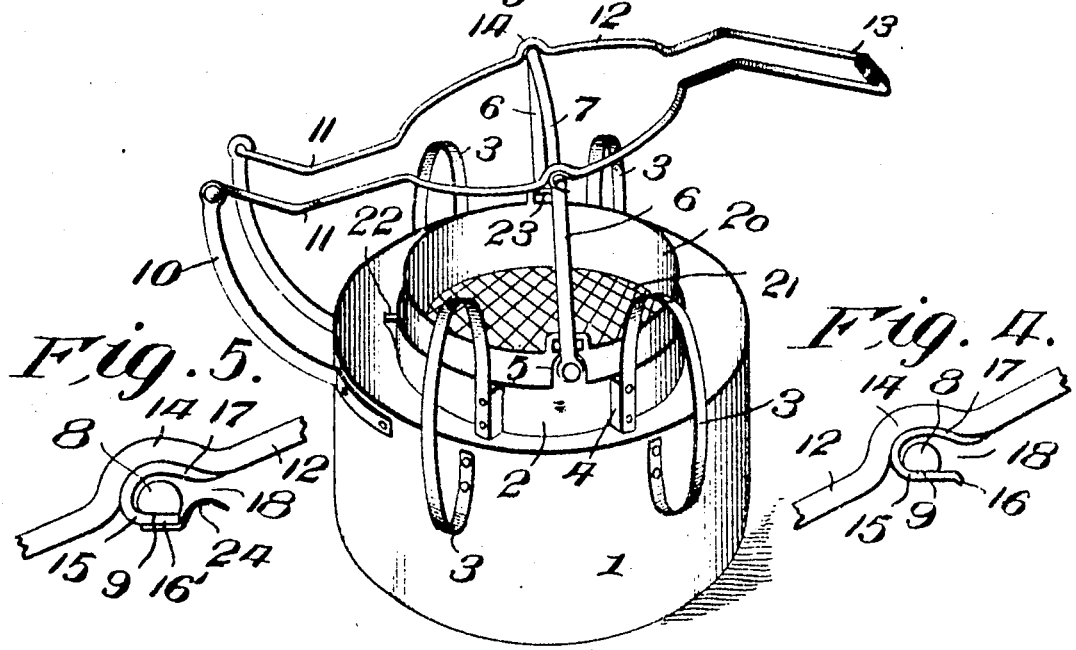
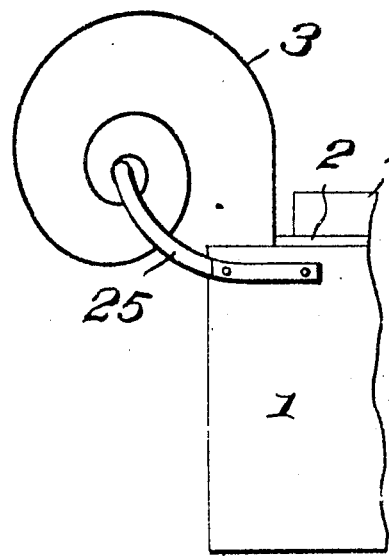
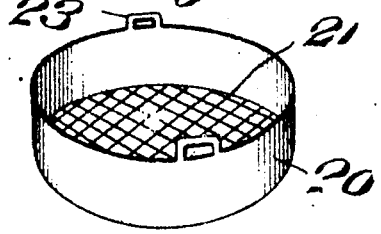
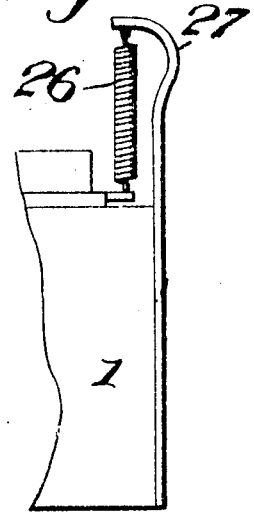
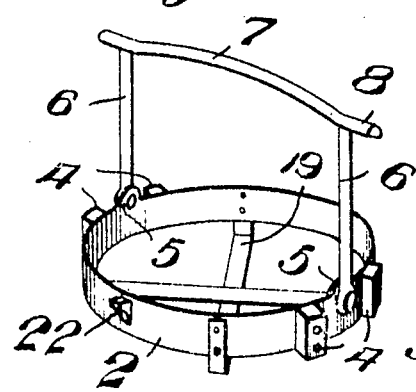
Inventor
J. M. Gilbert
Witnesses
By W. J. Fitzgerald
Attorneys

UNITED STATES PATENT OFFICE.

JOEL M. GILBERT, OF SUMMIT, NEW JERSEY.

DISH-WASHER.

No. 867,968.　　　　Specification of Letters Patent.　　　　Patented Oct. 15, 1907.

Application filed October 9, 1906. Serial No. 338,187.

*To all whom it may concern:*

Be it known that I, JOEL M. GILBERT, a citizen of the United States, residing at Summit, in the county of Union and State of New Jersey, have invented certain new and useful Improvements in Dish-Washers; and I do hereby declare the following to be a full, clear, and exact description of the invention, such as will enable others skilled in the art to which it appertains to make and use the same.

My invention relates to new and useful improvements in dish washing machines and my object is to provide a device of this class whereby the tray containing the dishes will be raised and normally held in an elevated position through the medium of springs.

A further object is to provide means for readily depressing the dish tray whereby the dishes will be immersed in water.

A still further object is to provide means for readily removing the dish tray from its supporting frame.

A still further object is to provide means for quickly attaching and detaching the several parts of the operating mechanism.

Other objects and advantages will be hereinafter referred to and more particularly pointed out in the claims.

In the accompanying drawings which are made a part of this application, Figure 1 is a perspective view of my improved dish washer complete and ready for use. Fig. 2 is a perspective view of the dish tray removed from its supporting frame. Fig. 3 is a perspective view of the supporting frame removed from the washer proper. Fig. 4 is a detail elevation on an enlarged scale showing the connecting means between parts of the operating device. Fig. 5 is a similar view of a slightly modified form of connecting means, and, Figs. 6 and 7 are detail elevations showing slightly modified forms of supporting springs.

Referring to the drawings in which similar reference numerals designate corresponding parts throughout the several views, 1 indicates a pan which may be of any desired dimensions and preferably circular within which is adapted to vertically reciprocate a supporting frame 2; said supporting frame being of less diameter than the pan and normally concentric therewith, the supporting frame being held in position by means of spring arms 3. The spring arms 3 are preferably curved and form substantially a complete circle, one end of the spring arms being secured to the upper edge of the pan 1, while the opposite ends thereof are secured to blocks 4 carried upon the periphery of the supporting frame 2 and to normally support the supporting frame concentric with the pan, the springs are disposed in pairs upon opposite sides of the supporting frame and spaced a suitable distance apart so that the tension of the spring arms with respect to the supporting frame will be equalized.

Extending upwardly from the supporting frame 2 and preferably midway between each pair of spring arms are ears 5 to each of which is pivotally secured a standard 6, the upper ends of said standards being formed integral with the curved cross bar 7, the ends of the cross bar extending beyond the standards to form trunnions 8, the lower surfaces of which are flattened as best shown at 9 in Fig. 4 of the drawing.

Secured to the outer face of the pan 1 are upwardly and outwardly extending brackets 10 to the upper ends of which is pivotally secured an operating lever, said lever being preferably formed of a section of rod bent upon itself at its central portion to form parallel sections 11, the central portions 12 of which are curved outwardly a sufficient distance so that when the operating lever is swung downwardly the curved portions 12 will extend to the outside of the supporting frame 2. The free ends of the sections 11 are pivoted to the brackets 10 while the opposite ends thereof are provided with a connecting bar 13 which forms a handle and by which means the operator can readily depress the operating lever.

A portion of the curved sections 12 at a point adjacent their longitudinal center is struck up as at 14 to form seats for substantially hook-shaped sockets 15 which are rigidly secured within the struck up portions 14 and are adapted to receive the trunnions 8 of the cross bars 7, the lower horizontal section 16 of the sockets 15 engaging the flat surface 9 of the trunnions. The upper section 17 of the socket 15 is curved to fit the contour of the struck up portions 14 while the section 16 is disposed in a horizontal plane and substantially straight so that the mouth 18 of the socket 15 will be narrower than the body portion of the socket and it will be readily seen that by providing the flat portion 9, that the trunnion will readily enter the mouth 18 but as soon as the operating lever is depressed, the horizontal portion 16 will be moved away from the flat portion 9 and the socket slightly rotated on the trunnions thereby presenting the full diameter of the trunnions to the mouth 18 and preventing the trunnion from leaving the sockets during the operation of the lever.

The supporting frame 2 is preferably in the form of a circular band and is provided at its lower end with crossed slats 19, said slats having their ends disposed at right angles and secured to the face of the supporting frame.

Disposed within the supporting frame 2 and resting upon the slats 19 is a dish tray 20, said tray also being preferably circular and of sufficient diameter to snugly fit within the supporting frame and the bottom of the tray is formed from any suitable perforated material and preferably of heavy woven wire 21 so that the water can freely enter the tray when the supporting frame is directed downwardly into the pan. In disposing the tray within the supporting frame, the trunnions 8 are released from the sockets 15 and the standards 6 lowered until the cross bar 7 engages a stop 22 upon the supporting frame after which the operating lever is lowered until the curved portions 12 are disposed around the upper edge of the supporting frame 2, when the tray 20 can be readily removed from or seated within the supporting frame, a pair of slotted ears or handles 23 being provided upon opposite sides of the tray 20 so that the tray can be conveniently handled.

In Fig. 5 of the drawing I have shown a slightly modified form of socket 15 in that the horizontal portion 16' is shortened and a spring tongue 24 secured to the horizontal portion 16' and directed upwardly towards the portion 17 to form the mouth of the sockets, the object of the spring being to prevent the trunnions 8 from casually leaving the sockets.

In Fig. 6 of the drawing I have shown the spring arms 3 provided with several coils and secured to the pan 1 by means of curved arms 25 while in Fig. 7 of the drawing I have dispensed with the spring arms and employed coil springs 26, one end of which is secured to the supporting frame, while the opposite end thereof is secured to a standard 27 carried by the pan 1.

In operation a suitable quantity of heated water is placed in the pan 1 and the tray holding the dishes to be washed is then placed in the supporting frame after which the standards 6 are swung to a vertical position and the trunnions 8 entered within the sockets 15 when by depressing the operating lever, the supporting frame and tray will be immersed in the water and as the bottom of the tray is perforated the water will be forced through the perforations and between the dishes contained within the tray. As soon as the supporting frame has been depressed to its fullest extent, the pressure upon the operating lever is removed whereupon the spring arms 3 will again elevate the supporting frame and allow the water within the tray to descend between the dishes and by repeating this operation a sufficient number of times the dishes within the tray will be thoroughly cleansed.

By this construction it will be seen that I have provided a very cheap and economical device for quickly and thoroughly washing dishes and one wherein the parts may be readily disposed out of position when it is desired to remove the tray of dishes from the supporting frame and again quickly connected together when the tray has been returned to the supporting frame.

It will also be seen that by providing the spring arms and the form of operating lever shown, that the supporting frame will be held substantially concentric with the pan 1 even should the weight of dishes be greater at one edge than at the other as the spring arms are so regulated that they will exert equal tension at all points upon the supporting frame.

What I claim is:

1. In a dish washer the combination with a pan having a supporting frame therein and yielding means to normally support said frame at the upper edge of the pan; of standards pivotally secured to said supporting frame, trunnions on said standards, an operating lever, sockets upon said lever adapted to engage said trunnions and means to prevent casual removal of the trunnions from the sockets.

2. In a dish washer the combination with a pan and a frame yieldingly supported within said pan; of standards pivotally secured to said frame, trunnions on said standards and having one portion thereof flattened, an operating lever and sockets upon said operating lever adapted to receive said trunnions, the mouth of said sockets being of less width than the diameter of said trunnions.

3. In a dish-washer the combination with a pan having curved brackets thereon; of a supporting frame, blocks on said frame, springs for said frame one end of said springs being secured to the outer surface of the pan while the opposite ends thereof are secured to said blocks, upwardly extending ears on said frame, standards pivotally secured to said ears, a cross bar connecting the upper ends of said standards and extending beyond said standards to form trunnions, an operating lever formed in sections, the free ends of which are pivotally secured to said brackets, means carried by said sections to engage said trunnions and removably secure the same thereto.

4. In a dish-washer the combination with a pan having brackets thereon; of a supporting frame, means to yieldingly support said frame within the pan, standards pivotally secured to said frame, a cross bar between the upper ends of said standards, said cross bar being extended at each end to form trunnions, each trunnion having a flattened portion, an operating lever pivotally secured to said brackets, sockets carried by said operating lever, the mouths of said sockets being reduced whereby the trunnions will be held in the sockets when the lever is depressed.

5. In a dish washer the combination with a pan and a supporting frame yieldingly mounted therein; of means to depress said supporting frame comprising standards pivotally secured to the frame, trunnions extending at right angles to the upper ends of said standards, said trunnions having their lower surfaces flattened, an operating lever pivotally secured at one end to said pan, hook shaped sockets carried by said lever and adapted to removably secure the trunnions to the lever, the entrance to each of said sockets being of less width than the diameter of said trunnions.

In testimony whereof I have signed my name to this specification in the presence of two subscribing witnesses.

JOEL M. GILBERT.

Witnesses:
SOLON C. KEMON,
J. EDWIN BURCH.